Patented Oct. 27, 1925.

1,559,330

UNITED STATES PATENT OFFICE.

BENNO LOWY, OF SAN FRANCISCO, CALIFORNIA.

PROCESS OF AND COMPOSITION FOR DOUGH MAKING.

No Drawing.   Application filed May 18, 1925.   Serial No. 31,209.

*To all whom it may concern:*

Be it known that I, BENNO LOWY, a citizen of the United States, residing at San Francisco, in the county of San Francisco and State of California, have invented certain new and useful Improvements in Process of and Composition for Dough Making, of which the following is a specification.

This invention relates to a composition for use in bread making and to a process of dough making using a milk composition for the quick developing, ageing and maturing of straight or sponge doughs, as used in bakeries, this case being a continuation, in part, of my application, Serial No. 753,809, filed Dec. 4th, 1924.

It will be understood by those skilled in the art that it is common to accelerate and strengthen the yeast action in dough by various kinds of yeast food, but in the present case I attain the desired rapidity of action by so treating the gluten cells of the dough as to cause them to be acted on much more rapidly by the yeast ordinarily used without the use of accelerating agents of that character.

In the present case the dough may be taken direct to the cutting and weighing machines for baking without the repeated risings ordinarily required, thereby saving the weight lost each time the dough is allowed to ferment in the usual way.

This process which consists in adding a suitable composition to the ready mixed usual dough saves about 80% of the time in common bread making processes.

In the present process the dough is prepared in the usual way as may be required i. e. the flour, yeast, fats, sugar, and salt are mixed in any way desired for bread or cake, the quantities of each of the above ingredients being determined by the kind of a product desired.

The composition herein referred to and used consists of condensed buttermilk, having between 2.5% to 5% lactic acid. This material is then mixed with calcium phosphate at a temperature of about 40° C. to produce a calcium-lacto-phosphate. This composition can then be mixed with a tartaric acid compound (preferably ammonium tartrate) as a catalyst to aid in breaking down the loosely combined calcium-lacto-phosphate by the action of the carbon dioxide of the yeast fermentation. Other catalysts can be employed, such as sodium sulphate.

The above composition is made by first mixing 100 pounds of the buttermilk with about one and one-quarter pounds (1¼) of the calcium phosphate at 40° C. and then adding about three-fourths pounds of the ammonium tartrate to the mixture.

In practice the best results will be obtained by mixing the dough in the following manner:

Take flour, 196 pounds; sugar, 6.5 pounds; salt, 4.5 pounds; yeast, 3.0 pounds; shortening, 8.0 pounds; milk compound, 2.0 pounds; water, about 125.0 pounds.

Mix yeast with water as usual. Separately mix my milk compound in a bucket of water which is part of the above quantity of water; the temperature of the water as used in the total mixture should be between 74° and 76° F.

Place yeast-water, said milk-compound water, with the rest of the water into the mixture, and add sugar and salt. After obtaining a uniform solution which will occur almost immediately, place the flour into a mixer and begin mixing. During the mixing, add the shortening. Mix for seventeen (17) minutes in a slow speed mixer, or eight (8) minutes in a high speed mixer. The agitation will bring the temperature of the mixture up to about 86° F.

Place the dough in a trough. Be sure that dough temperature is 86° F. and not below. Allow to stand in the trough for twenty (20) minutes, after which time the dough goes to the divider and moulder for about nine (9) minutes. The actual setting free of the lactic acid begins at this stage, and continues for the time following while the dough is placed into the pan and incubated in the proofing box for about an hour. The temperature of the proofing box should be between 90° and 100° F.

The lactic acid thus liberated mellows the gluten cells and thus allows the carbon-dioxide gas from the yeast fermentation to enter freely into the cells and thereby lays a foundation for a well risen loaf.

The buttermilk contains certain esters of complicated structure which constitute the real flavor agent in the bread. The bread obtained by my process therefore has a rich, appetizing flavor which is distinctly a butter flavor through the presence of the buttermilk acid and which cannot be obtained by the use of lactic acid alone. The crumb of the bread appears bleached and the crust well colored.

What I claim is as follows, but modifications in the process may be made within the purview of the appended claims.

1. The process of producing a bread-making compound, consisting of mixing to one hundred pounds of condensed buttermilk of high lactic acid content with 1¼ pounds of calcium phosphate at about 40° C. and then adding ¾ pound of ammonium tartrate to the mixture.

2. A process of producing a break-making compound, which comprises mixing an acid milk with calcium phosphate at a low temperature and using a catalyst such as ammonium tartrate, to facilitate the splitting action of the loosely held calcium-lacto-phosphate through the presence of carbon-dioxide of the yeast fermentation.

3. A bread making composition consisting of a calcium-lacto-phosphate mixed with a tartrate.

4. A bread making composition consisting of a calcium-lacto-phosphate mixed with a catalyst capable of aiding in breaking down the loosely combined calcium-lacto-phosphate when subjected to the action of fermentation of a dough.

5. A process of bread making which comprises forming a composition by mixing an acid milk with calcium-phosphate at a low temperature to produce a calcium-lacto-phosphate, adding a tartrate, and then mixing the mass with a dough and allowing it to ferment.

6. A process of bread making which comprises forming a composition by mixing an acid milk with calcium phosphate at a low temperature to produce a calcium-lacto-phosphate, adding ammonium tartrate, and then mixing the mass with a dough and allowing it to ferment.

7. A process of bread making which comprises forming a composition by mixing acid milk with calcium phosphate at 40° C. to produce a calcium-lacto-phosphate, adding ammonium-tartrate, dissolving said composition together with yeast, salt and sugar in water, introducing into said solution flour sufficient to form a dough, said composition to be in the proportion of one per cent by weight to the amount of flour used, adding shortening and thoroughly mixing the dough at a temperature of about 86° F.

In testimony whereof I affix my signature.

BENNO LOWY.